US009255714B2

(12) United States Patent
Mikulec

(10) Patent No.: US 9,255,714 B2
(45) Date of Patent: Feb. 9, 2016

(54) COOKERY AIR PURIFICATION AND EXHAUST SYSTEM

(71) Applicant: Conrad S. Mikulec, Buffalo, NY (US)

(72) Inventor: Conrad S. Mikulec, Buffalo, NY (US)

( * ) Notice: Subject to any disclaimer, the term of this patent is extended or adjusted under 35 U.S.C. 154(b) by 0 days.

(21) Appl. No.: 14/691,543

(22) Filed: Apr. 20, 2015

(65) Prior Publication Data

US 2015/0226439 A1 Aug. 13, 2015

Related U.S. Application Data

(63) Continuation-in-part of application No. 13/650,100, filed on Oct. 11, 2012, now Pat. No. 9,010,313.

(60) Provisional application No. 61/627,302, filed on Oct. 11, 2011.

(51) Int. Cl.
*F24C 15/20* (2006.01)
*A47J 27/62* (2006.01)
*A62C 3/00* (2006.01)

(52) U.S. Cl.
CPC ............ *F24C 15/2021* (2013.01); *A47J 27/62* (2013.01); *A62C 3/006* (2013.01)

(58) Field of Classification Search
CPC ............ F24C 15/2021; F24C 15/2035; F24C 15/2042; A62C 3/006; A47J 27/62
See application file for complete search history.

(56) References Cited

U.S. PATENT DOCUMENTS

| | | | | |
|---|---|---|---|---|
| 4,756,839 | A | 7/1988 | Curzon et al. | |
| 4,813,487 | A | 3/1989 | Mikulec et al. | |
| 4,979,572 | A | 12/1990 | Mikulec | |
| 5,351,760 | A | 10/1994 | Tabor, Jr. | |
| 5,992,531 | A | 11/1999 | Mikulec | |
| 7,303,024 | B2 | 12/2007 | Mikulec | |
| 2008/0029081 | A1 * | 2/2008 | Gagas et al. | 126/299 D |

* cited by examiner

*Primary Examiner* — Alfred Basichas
(74) *Attorney, Agent, or Firm* — Lakeview Patents, LLC

(57) ABSTRACT

An air filtration and exhaust system is described. The system comprises a microcontroller, a power supply, and a series of sensors that detect the presence of airborne contaminants such as ultra fine particles, smoke, natural gas and radon gas. In the presence of these airborne contaminants, the system is designed to inactivate and prevent operation of nearby food preparation appliances. Once these contaminants have been safely removed, the operation of these appliances is restored. In addition, the ventilation system may be equipped with a purification subassembly, which safely and efficiently removes such containments from the area. The system may also comprise an alarm that is activatable in the presence of these contaminants.

44 Claims, 10 Drawing Sheets

COOKERY AIR PURIFICATION AND EXHAUST SYSTEM

CROSS-REFERENCE TO RELATED APPLICATION

The present application is a continuation in part of U.S. application Ser. No. 13/650,100, filed Oct. 11, 2012, now U.S. Pat. No. 9,010,313, which claims priority to U.S. provisional application Ser. No. 61/627,302 filed, Oct. 11, 2011.

BACKGROUND OF THE INVENTION

1. Field of the Invention

The present invention relates to air purification systems and more particularly, to an air purification and ventilation system for use with cooking appliances.

2. Prior Art

Ventilation and purification systems for stoves and other cooking appliances are well known. Many different types of cooking appliances produce smoke, carbon monoxide, natural gas and ultra fine particles that are released into ambient air. In addition, food preparation and cooking activities could also release microorganisms and viruses into the air. Such contaminants could adversely affect the health of the person or persons present in the kitchen or food preparation area. Often, it is considered beneficial to utilize some type of ventilation system to evacuate these air borne contaminants.

In kitchens, most known venting arrangements take the form of a ventilation hood which is fixed above a cooking surface and which can be selectively activated to evacuate contaminated air. However, operating a kitchen appliance, such as an oven, stove, or toaster in the presence of these contaminants could result in not only contamination of the food being prepared, but also may be detrimental to the health of the person present in the kitchen. Ultra fine particles and other particulate matter, comprising both organic and inorganic based matter, are often given off by these appliances and could easily be inhaled or become embedded within food. These particles typically range in size from about 1 nm to about 100 nm and thus, because of their small size, may easily travel deep within lung tissue and undergo interstitialization within the body.

Exposure to ultra fine particles, even though these particles may not be toxic to the body, have been known to cause oxidative stress or inflammatory mediator release, which could over time, induce lung disease or other health problems. Other contaminants, such as natural gas, might leak from the stove or oven and could result in an explosion or fire.

Operating these kitchen appliances in the presence of these contaminants therefore, is not desirable. In addition, the presence of smoke or a gas, such as natural gas or carbon monoxide could indicate a potential fire or other potential hazard. Therefore, continued use of cooking appliances, particularly those that give off heat or produce a flame, are not desirable and could potentially lead to a fire or explosion.

It is therefore desirable to remove these airborne containments, particularly from the food preparation area. In addition, it is desirable to control the operation of various cooking appliances in the presence of these containments. Such airborne contaminants could contaminate the food being prepared as well as damage lung tissue.

SUMMARY OF THE INVENTION

The present invention provides a ventilation hood system designed to operate in conjunction with other appliances in a food preparation area such as a kitchen. The ventilation system is responsive to the presence of smoke, radon gas, carbon monoxide gas, natural gas, and ultra fine particulate matter among others. In the presence of these airborne contaminants, the system is designed to inactivate and prevent operation of nearby food preparation appliances. Once these contaminants have been safely removed, the operation of these appliances is restored. In addition, the ventilation system may be equipped with a purification subassembly, which safely and efficiently removes such containments from the area.

The ventilation system comprises a series of sensors that detect the presence of various airborne contaminants including, but not limited to, smoke, natural gas, carbon monoxide and ultra fine particles. These sensors may be directly or wirelessly connected to a microcontroller or microprocessor that controls the operation of the stove or oven and other food preparation appliances which might be connected to nearby electrical outlets in the area. An impellor or a fan, which is electrically connected to the microcontroller or a microprocessor, is positioned within the ventilation hood, preferably within the main body or plenum of the ventilation hood. The fan operates at variable speeds thus generating a wide range of air velocities designed to evacuate various volumes of contaminated air from the building and/or circulate the contaminated air through the filtration subassembly.

The ventilation system comprises at least one shutoff mechanism such as a gas shutoff mechanism or electrical shutoff mechanism designed to enable or disable operation of a stove and/or oven. The shutoff mechanism is designed to work with either an electrical or gas powered stove to shutoff the electricity and/or gas supply. An alarm may be provided such that an audible or visual indication is given when contaminants are detected. The alarm may be configured to contact a first responder at a fire station, police station or other remote location.

In addition, the ventilation system may work in conjunction with a fire suppression system positioned either within the ventilation hood or the general food preparation area. The ventilation system of the present may be connected to the fire suppression system such that when smoke, natural gas, carbon monoxide gas or excessive heat is detected, the fire suppression system is activated.

DETAILED DESCRIPTION OF THE PREFERRED EMBODIMENTS

Figure 8:
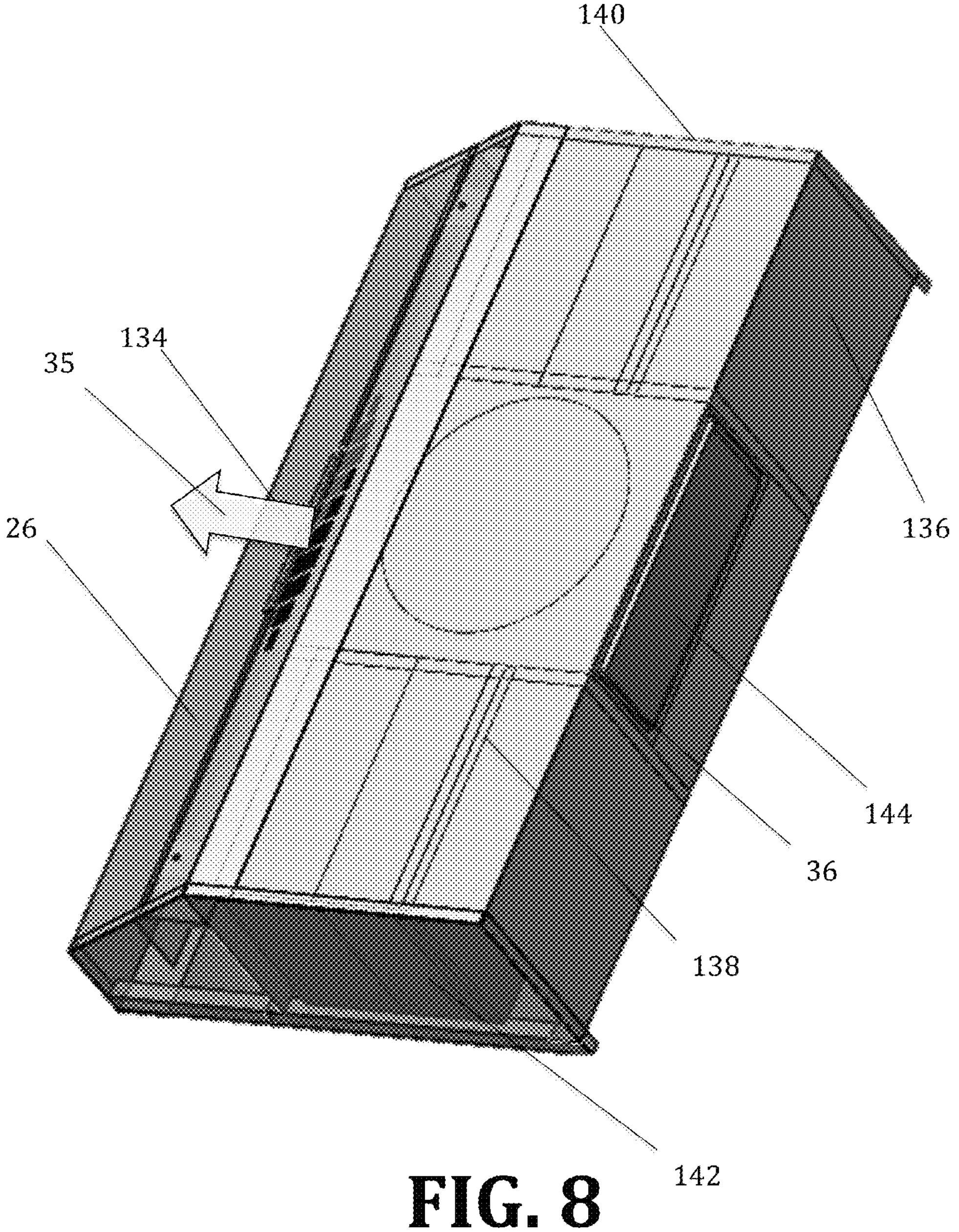
FIG. 8 shows a perspective view of an embodiment of the topside of the air filtration system of the present invention in a ventilation hood.
Figure 9A:
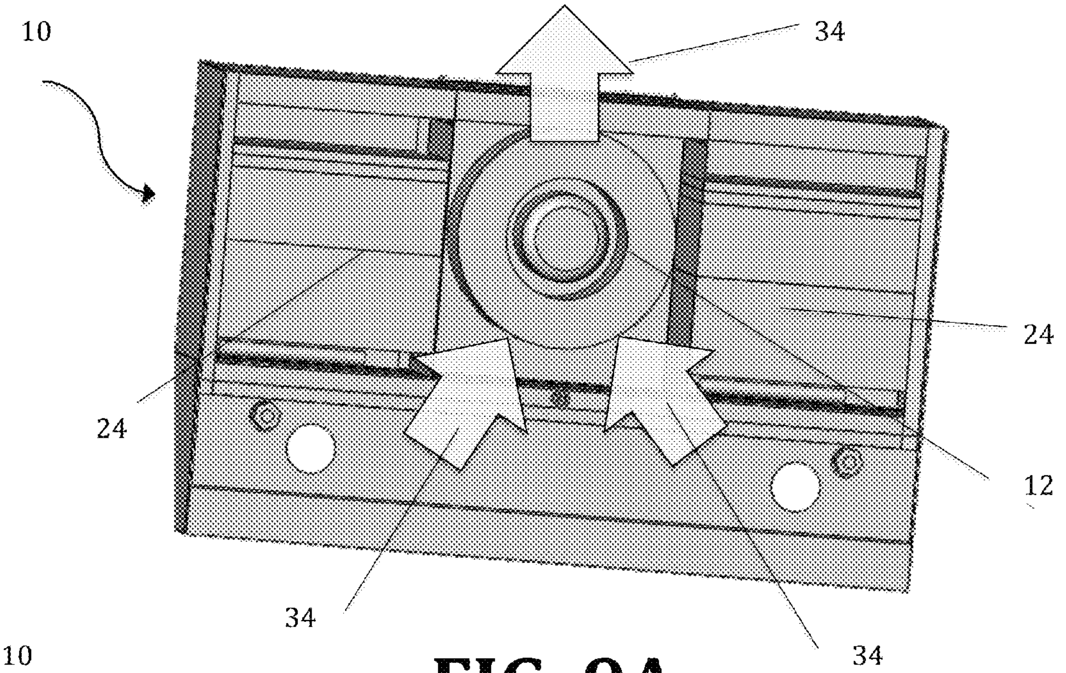
FIG. 9A illustrates an embodiment of the airflow through the system in which contaminated air is exited out a back door opening.
Figure 9B:
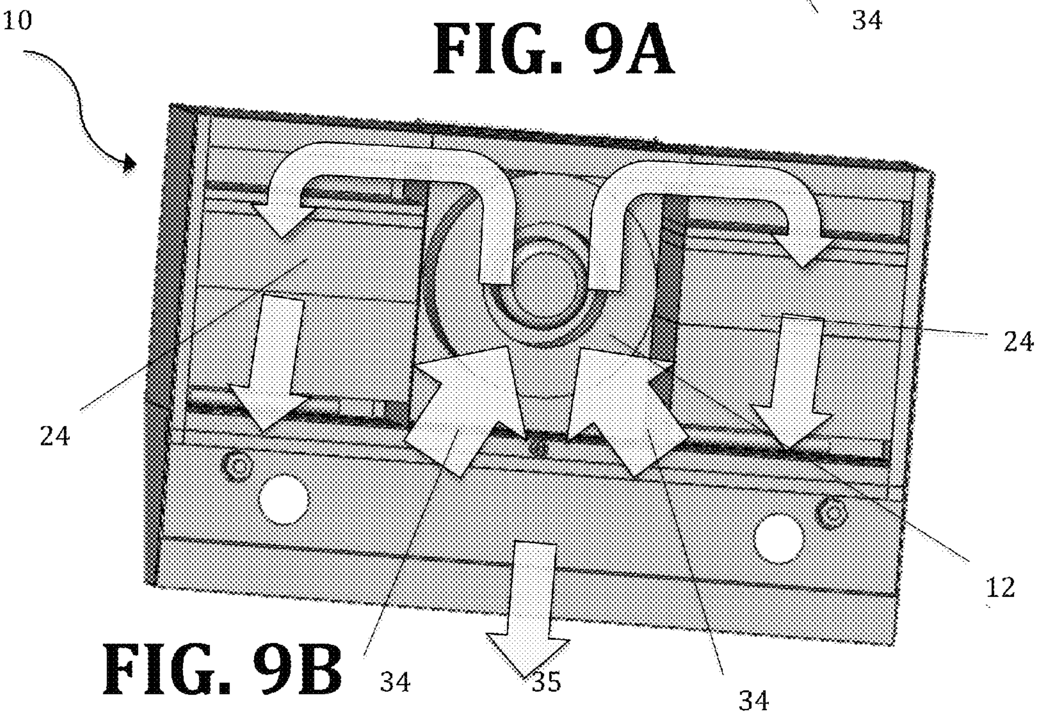
FIG. 9B illustrates an additional embodiment of the airflow through the system in which contaminated air flows through the filtration subassembly.
Figure 10:
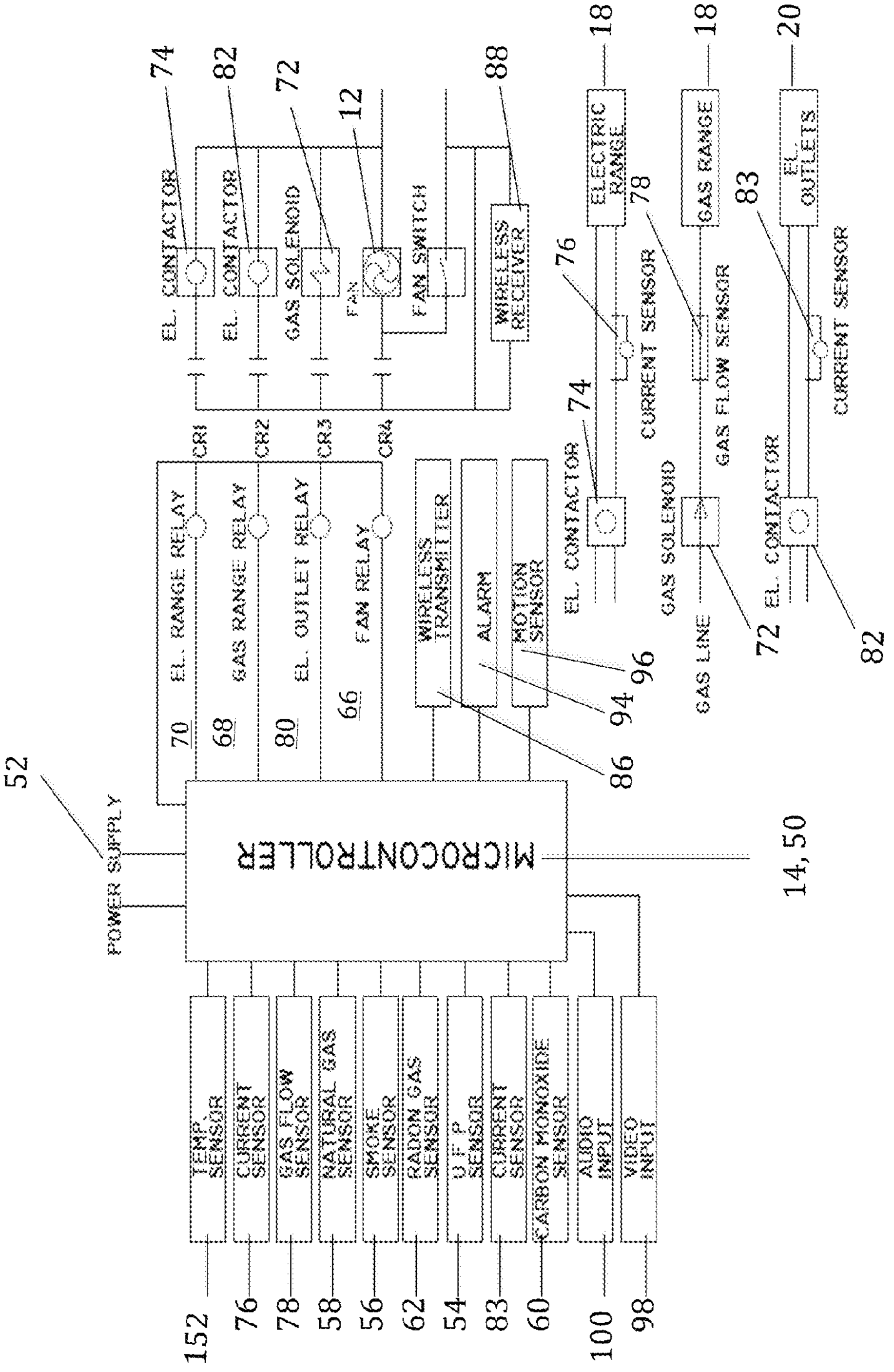
FIG. 10 is a schematic diagram showing the electrical connections comprising the ventilation system of the present invention.
Figure 11:
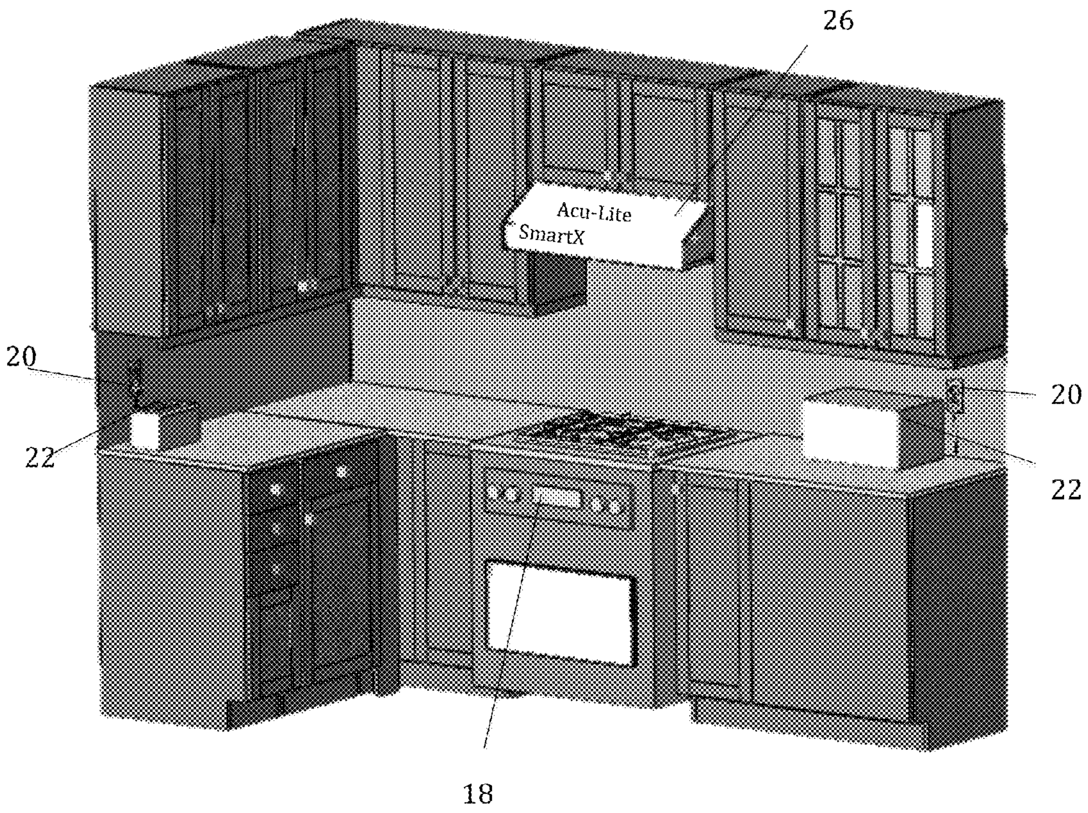
FIG. 11 shows a perspective view of an embodiment of the ventilation system of the present invention installed within a food preparation area.

Now referring to the figures, FIGS. 1-4, 7-8, 9A, 9B, 10 and 11 illustrate embodiments of a ventilation system 10 of the present invention. The ventilation system 10 comprises a ventilation fan 12, a microcontroller 14 and a series of sensors 16 that are in communication with the microcontroller 14 (FIG. 10). The sensors 16 are designed such that they provide feedback may be provided back and forth between the sensor 16 and the microcontroller 14. In a preferred embodiment, the sensors 16 may be connected to the microcontroller 14 by a direct electrical connection or a wireless connection. The microcontroller 14 of the ventilation system 10 receives the various signals, monitors the data and acts accordingly based on the data and information provided by the sensors 16, in addition to user provided instructions, to control the flow of gas and electricity that powers a stove 18, surrounding electrical outlets 20, and food preparation appliances 22 (FIG. 11). These food preparation appliances 22 may include, but are not limited to, a toaster, a mixer, a blender, a toaster oven, a can opener and the like.

Figure 2:
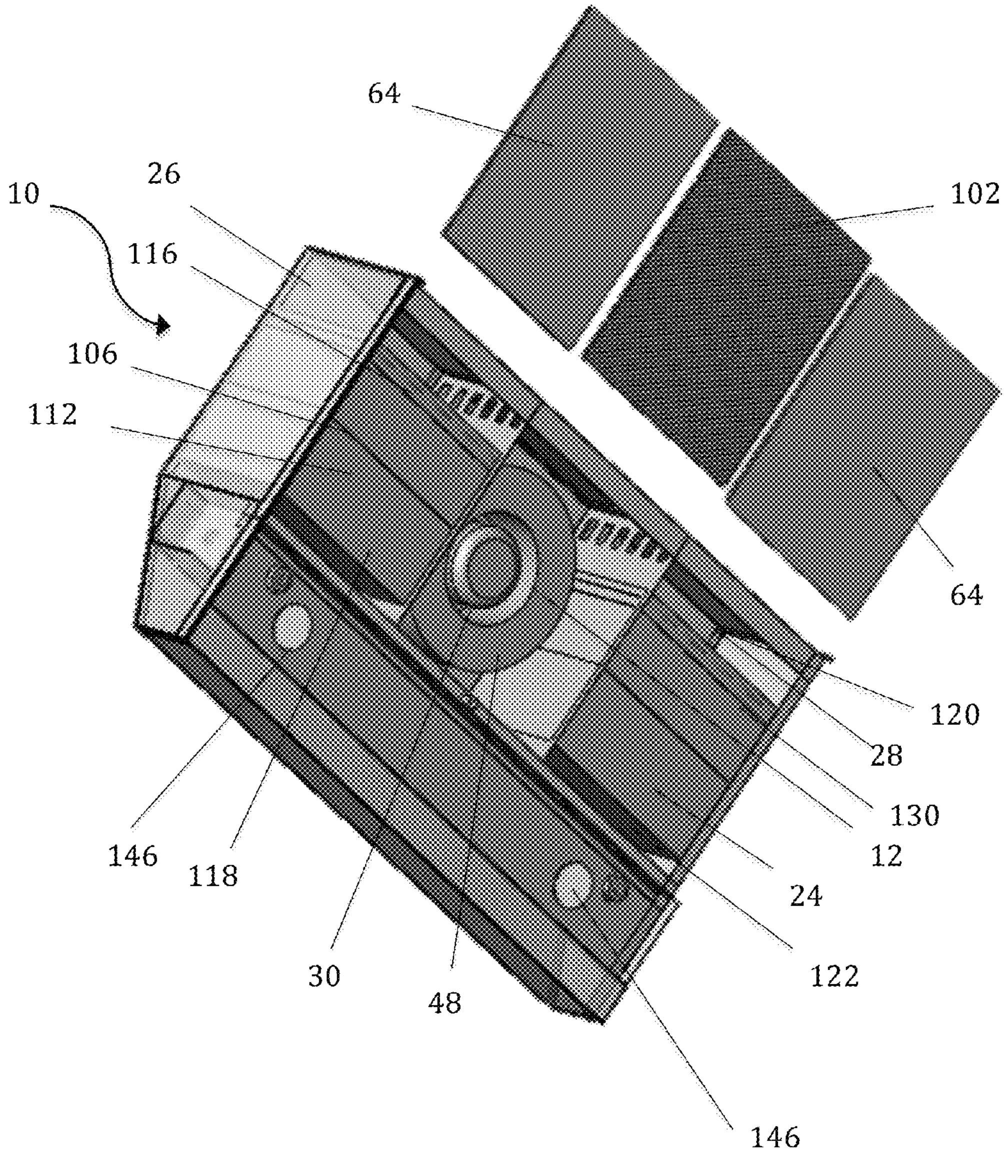
FIG. 2 shows a perspective view of the bottom side of the ventilation system positioned within the range ventilation hood.

In addition, the ventilation system 10 may comprise an air filtration subassembly 24 (FIGS. 2, 9A, and 9B). As shown, the air filtration subassembly 24 is preferably positioned adjacent to the ventilation fan 12. In a preferred embodiment, the ventilation system 10 is designed to fit within a ventilation hood 26, more preferably, within a plenum portion 28 of the ventilation hood 26 of a cooking appliance 22 such as a stove or oven 18. Although it is preferred to position the system 10 within the plenum portion 28 of the ventilation hood 26 of the stove 18, the system 10 may be mounted to or within a ceiling such that it is positioned above the stove 18.

The term "stove" is herein defined as a portable or fixed apparatus that burns fuel, such as a gas or flammable liquid, or uses electricity to provide heat for the purpose of cooking or heating. The term "oven" is herein defined as a chamber that is heated through the burning of a fuel, such as a gas or flammable liquid, or uses electricity to provide heat for the purpose of cooking or heating. The term "range" is herein defined as a portable or fixed apparatus that burns fuel or uses electricity to provide heat for the purpose of cooking or heating. A "range" may comprise a multitude of burners and/or one or more ovens. The term "plenum" is herein defined as the space within the main body of a ventilation hood of a stove or oven. The plenum portion of the ventilation hood typically resides at the rear of the ventilation hood. The term "canopy" is herein defined as the front portion of the ventilation hood of a stove or oven. The canopy portion of the ventilation hood typically has a downward angle.

As shown in FIGS. 1-3, 9A and 9B, the fan 12 is preferably positioned within and about the center of the plenum portion 28 of the ventilation hood 26. An air intake opening 30 is positioned along an exterior surface 32 (FIG. 6) of the fan 12. The fan 12 is designed such that contaminated air 34 enters through the air intake opening 30 of the fan 12. The contaminated air 34 is then either forced out a side hood opening 36, such as a back side hood opening, as shown, and/or is forced through the filtration subassembly 24, where the contaminated air 34 becomes purified. Alternatively, the system 10 may be designed with at least a left side door, a right side hood door, and a top side hood door to allow for the opening 36 for the contaminated air 34 to exit.

Furthermore, although it is preferred that the fan 12 is positioned within the center of the plenum portion 28 of the ventilation hood 26, the fan 12 may be placed within a left side 42 or a right side 44 of the ventilation hood 26. In a preferred embodiment, the ventilation fan 12 provides an adjustable airflow of at least 5 cubic feet per minute (CFM) through the ventilation hood 26 and the filtration subassembly 24.

Figure 6:
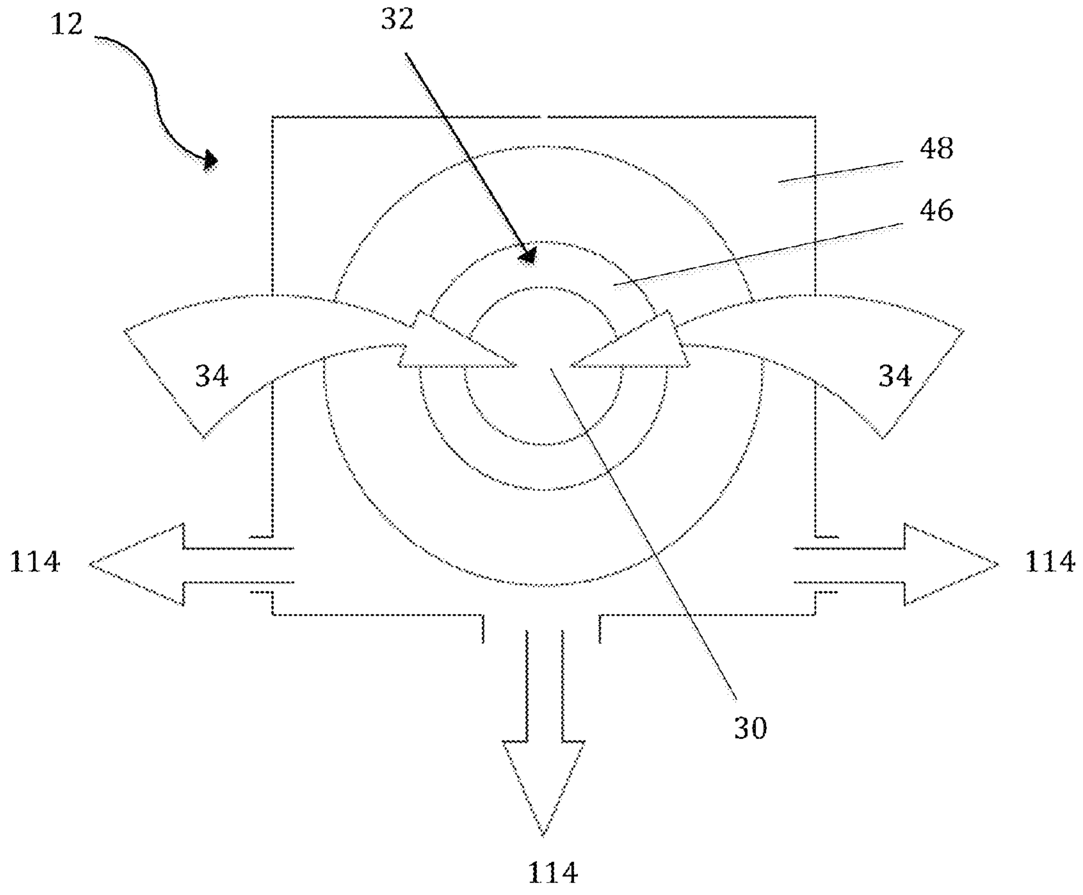
FIG. 6 is a schematic drawing of an embodiment of the air circulation pattern caused by the movement of the impellor of the fan of the ventilation system of the present invention.
Figure 7:
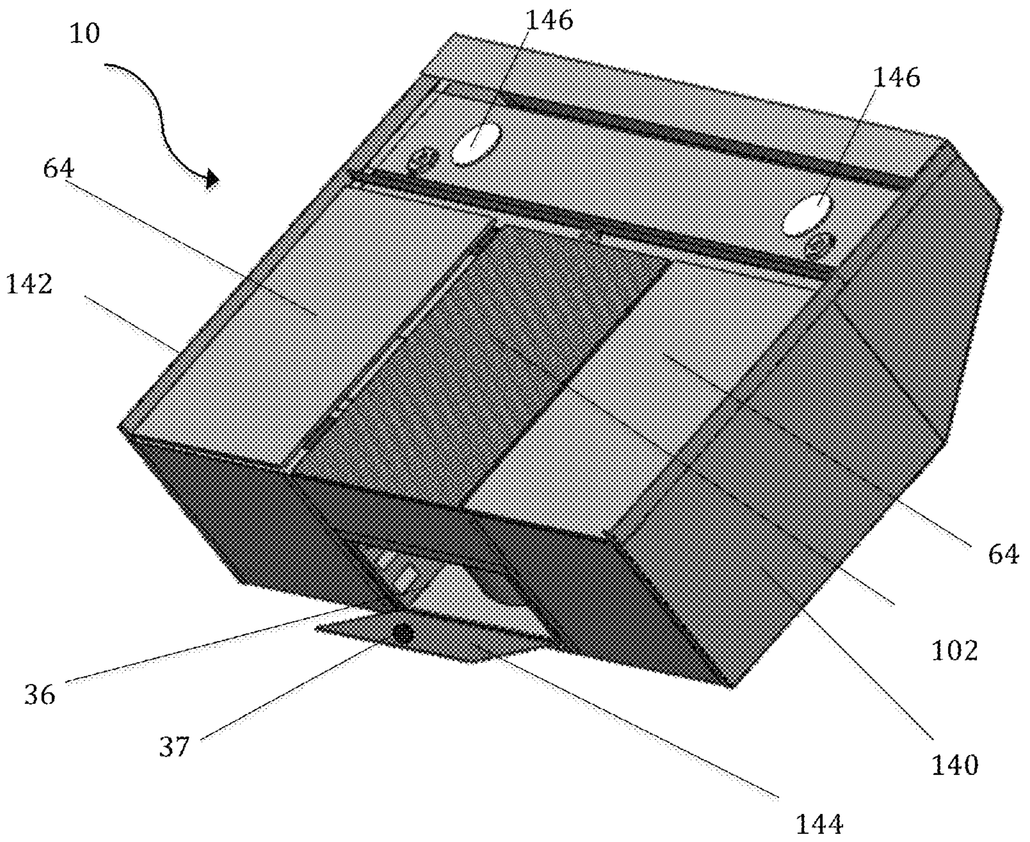
FIG. 7 illustrates a perspective view of an embodiment of the bottom side of the air filtration system of the present invention in a ventilation hood.

As shown in FIGS. 6 and 7, contaminated air 34 enters the air intake opening 30 and is either circulated through the filtration subassembly 24 or exited out a side opening 36 of the ventilation hood 26 by an impellor 46 that resides within a fan housing 48. In a preferred embodiment, as shown in FIG. 9A contaminated air 34 enters the air intake opening 30 of the fan 12 and is immediately forced out of the ventilation hood 26 through the side door opening 36 by the impellor 46.

Alternatively, as shown in FIG. 9B, contaminated air 34 enters the fan air intake opening 30 and is circulated through the filtration subassembly to remove undesirable particulates and contamination. The contaminated air thus exits the ventilation hood 26 as purified air 35 into the food preparation area. As will be discussed in more detail, the airflow through the ventilation system 10 may be adjusted automatically by the microcontroller 14 based on analysis of the level of contaminants detected within the air 34.

Figure 3:
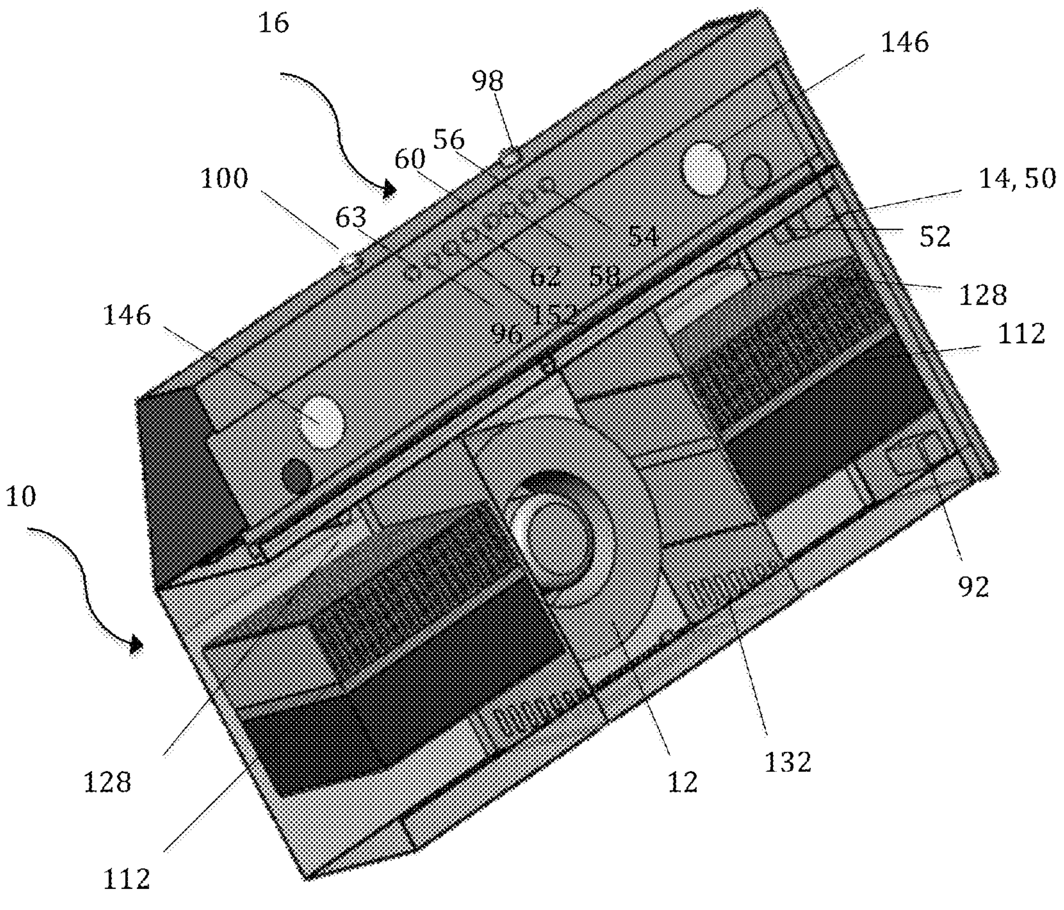
FIG. 3 is a partially broken perspective view taken from the bottom of an embodiment of the ventilation system positioned within a range ventilation hood.

As illustrated in FIG. 3, the microcontroller 14 is preferably positioned within the plenum portion 28 of the ventilation hood 26, adjacent to the fan 12 and filtration subassembly 24. Alternatively, the microcontroller 14 may be positioned at a remote location within the food preparation area. The microcontroller 14 may also be electrically connected to digital memory such as random access memory (RAM), read only memory (ROM), and the like. An electronic data storage device (not shown) such as a hard drive, or the like, may also be removably connected to the microcontroller 14. Such electronic memory devices provide the microcontroller 14 the ability to digitally store data such as operating settings, operating parameters, programming instructions, as well as record historical parameters, operations performed by the system 10 and collected data. Alternatively, a microprocessor 50 may be used instead of the microcontroller 14. Furthermore, the microcontroller 14 or microprocessor 50 may be controlled by a user via a hard wire or a wireless connection.

The microcontroller 14 or microprocessor 50 acts as the central control unit for the system 10. Information and data received from the various sensors 16 is received and processed by the microcontroller 14. The microcontroller 14 or microprocessor 50, in conjunction with previously programmed parameters and responses, may utilize the information received from the various sensors 16, to control the operation of the stove 18, fan 12, and other cooking appliances 22 that are connected to the electrical outlets 20 in the food preparation area. For example, if a response is received that is within acceptable operating parameters, operation of the cooking appliances 18, 22 will be allowed (FIG. 11). However, if a response is received that is not within acceptable operating parameters, operation of the cooking appliances 18, 22 will not be allowed. The system 10 is designed to continuously monitor the response of the sensors 16 and actively adjust operation of the appliances 18, 22 appropriately.

The system 10 also comprises at least one electrical power source 52 (FIGS. 3 and 10). The power source 52 is preferably positioned within the plenum portion 28 of the ventilation hood 26. The power source 52 is designed to provide electrical power to the at least one microcontroller 14, fan 12, and series of sensors 16 that comprise the system 10. In addition, the power source 52 may also provide electrical power to the filtration subassembly 24. In addition, the at least one electrical power source may be positioned at a remote location from the ventilation hood 26 or system components.

In a preferred embodiment, the power source 52 provides a direct current electrical power ranging from about 0.5 VDC to about 50 VDC, more preferably the power source 52 provides from about 1 VDC to about 10 VDC of electrical power 52. Alternatively, the power source 52 may provide an alternating current supply instead of a direct power supply. The power source 52 may be an electric alternating current supply that is typically provided in a residential or commercial building worldwide, such as about 110-120V, having a frequency of about 50-60 Hz, or about 220-230V, having a frequency of about 50-60 Hz. In an alternate embodiment, an electrochemical cell (not shown) or an electrical generator (not shown) may be used to power the ventilation system 10 of the present invention.

As shown in FIGS. 3 and 10, an ultra fine particle (UFP) sensor 54 is provided within the ventilation hood 26. In addition to the UFP sensor 54, the system 10 may comprise a smoke sensor 56, a natural gas sensor 58, a carbon monoxide sensor 60, a radon gas sensor 62, and/or a photocatalytic sensor 63. In a preferred embodiment, the ultra fine particle sensor 54 is positioned such that it is exposed to ambient air within the food preparation area. The sensor 54 may be positioned through an opening of the ventilation hood 26 such as a ventilation hood side panel 64 as shown in FIGS. 2 and 3. Alternatively, the UFP sensor 54 may be positioned at a remote location within the food preparation area such as on a wall, ceiling or cabinet. In such cases, the sensor 54 is positioned such that at least a portion of the detector mechanism of the sensor 54 is exposed to at least a portion of ambient air within the food preparation area. The system 10 is designed to comprise at least one UFP sensor 54. Alternatively, the system 10 may comprise more than one UFP sensor 54 that may be positioned at various locations within the food preparation area, thus providing information pertaining to the ultra fine particle content simultaneously at multiple locations within a room or at various time intervals.

In a preferred embodiment, the microcontroller 14 or microprocessor 50 of the system 10 receives a signal from the UFP sensor 54. The response signal emitted by the UFP sensor 54 is read and analyzed by the microcontroller 14. The information received by the sensor 54 is then compared to a pre-determined threshold value by the microcontroller 14. In a preferred embodiment, the signal from the ultra fine particle sensor is in direct proportion to the number of ultra fine particles per cubic unit of area in the ambient air. Furthermore, a threshold value or values may be programmed within the microcontroller 14 of the system 10. Thus, if it is determined by the response signal from the UFP sensor 54, that the ambient air comprises an ultrafine particle count that is above an acceptable ultra fine particle count threshold value, the stove 18 is rendered nonoperational for a period of time. In a preferred embodiment, gas or electrical power that operates the stove 18 is temporarily turned off. In addition, electrical power provided by nearby electrical outlets 20, is also shutoff for a period of time as well, thereby preventing operation of additional food preparation appliances 22 that are connected to the electrical outlets 20.

Furthermore, in the event that the response signal is determined to correspond to an ultra fine particle count that is above the specified particle count threshold level, the fan 12 is turned on (if not already on) and the speed of the fan 12 is increased, preferably to maximum to increase the volume of air that passes through the system 10. Hence, by increasing the volume of air that passes through the system 10, the area is quickly rid of the airborne contaminants.

In a preferred embodiment, after a period of time, which has been programmed into the microcontroller 14, the response signal of the UFP sensor(s) 54 may be sampled again to determine if the particle level is below the prescribed threshold level. Once the particle level within the ambient air has been determined to have decreased to a level below a predetermined particle count threshold level, the shutoff mechanism is activated again to allow gas or electricity to flow, thereby enabling operation of the oven 18. In addition, electricity powering the electrical outlets 20 of the nearby food preparation appliances 22 is also allowed to flow, thereby making these appliances 22 operational. Furthermore, the speed of the fan 12 may be reduced accordingly.

The signal that is emitted by the sensor or sensors 54 may be an electrical voltage, an electrical current, or combinations thereof. In a preferred embodiment, the threshold value may range from about 0.01 mV to about 100 mV. Alternatively, the threshold value may range from about 1 μA to about 100 mA. In addition, actuation of the shutoff mechanism may occur when the value of the response signal received from the sensor 16, such as the UFP sensor 54, is above, below or about equal to a threshold signal value that is programmable within the microcontroller 14. Furthermore, the value of a response signal received from at least one sensor 16, that corresponds to an acceptable or non-acceptable criteria, respectively, may be above, below or about equal to a threshold signal value that is programmable within the microcontroller 14.

Alternatively, the system 10 may operate without receiving a signal from a sensor 16. In this case, the shutoff mechanism is activated and operation of the oven 18 and/or surrounding electrical outlets 20 is halted for a period of time. After the specified period of time has passed, the shutoff mechanism is activated again to restore gas and/or electricity. In a preferred embodiment, this period of time may range from about one second to about 60 seconds, during which time the fan 12 may be turned on, preferably set at maximum speed to rid the air of contaminants.

In addition to the ultra fine particle sensor 54, as shown in FIGS. 3 and 10, the system 10 may comprise additional sensors 16, among these are the natural gas sensor 58, the carbon monoxide sensor 60, the radon gas sensor 62, the photocatalytic sensor 63, and the smoke sensor 56. Similar to the UFP sensor 54, these additional sensors 56, 58, 60, 62, and 63 are in communication with the microcontroller 14 or microprocessor 50, such as via a direct hard wire or wireless connection in addition to being connected to the power source 52. In an embodiment, these additional sensors 56, 58, 60, 62, and 63 may also be positioned within the ventilation hood 26 such that their respective detector portions of the sensor are exposed to ambient air within the food preparation area. In a further embodiment, the system 10 may comprise at least one of these additional sensors 56, 58, 60, 62, and 63. However, multiple sensors 56, 58, 60, 62, and 63 may be provided and positioned at remote locations within the food preparation area.

FIG. 10 illustrates an embodiment of an electrical circuit diagram of the system 10 of the present invention. In the embodiment shown, the UFP sensor 54, the smoke sensor 56, the natural gas sensor 58, the carbon monoxide sensor 60, the radon gas sensor 62, and the photocatalytic sensor 63 are electrically connected to the microcontroller 14 or microprocessor 50, which is electrically connected to a ventilation hood relay 66. As shown, the ventilation hood relay 66 is also electrically connected to the fan 12, which is capable of selectively controlling its operation and speed.

In addition, the microcontroller 14 or microprocessor 50 is preferably in communication with at least one shutoff mechanism, such as a gas range relay 68 or an electric range relay 70, which may be connected to a gas solenoid 72 and electric range contactor 74 respectively. The gas solenoid 72 controls the flow of gas to a gas-operated stove/oven 18, or portion thereof, and the electric range contactor 74 controls the flow of electricity to an electrically powered stove/oven 18, or portion thereof. In a preferred embodiment, the microcontroller 14 or microprocessor 50 may be directly or wirelessly connected to the at least one shutoff mechanism such as the gas or electrical range relay 68, 70.

As shown, the system 10 may also comprise a first current sensor 76, preferably positioned and electrically connected between the electric range contactor 74 and the electric stove portion 18. The first current sensor 76 monitors the flow of electric current between the electric range portion 18 and the electric range contactor 50, thus ensuring electricity therebetween has been turned off or tuned on appropriately. The system 10 may also comprise a gas flow sensor 78 that is preferably positioned between the gas solenoid 72 and the gas range 18. This sensor 72 monitors the flow of gas to the gas range 18, and portions thereof, thus ensuring that the flow of gas has been turned off or tuned on appropriately.

Furthermore, the system 10 may comprise an electrical outlet relay 80 that is electrically connected to a second electric contactor 82. The second electric contactor 82 is electrically connected to the electrical power outlet or outlets 20. The second electric contactor 82 controls the flow of electricity to the electrical outlets 20 and appliances 22. A second current sensor 83 may be positioned between the second electric contactor 82 and the electrical outlets 20 to ensure the flow of electricity therebetween is correct.

In an example, a signal is received by the microcontroller 14 or microprocessor 50 from the UFP sensor 54. If the microcontroller 14 or microprocessor 50 determines that the particle count is below a particle count threshold value, the relay switches 68, 70 and 80 are activated such that they are positioned to allow gas and/or electricity to flow and thus, enable the various appliances, i.e., the stove 18 and other appliances 22 to operate. However, if the microcontroller 14 or microprocessor 50 determines the particle count to be above a particle count threshold value, i.e., the particle count is above a certain level, the shutoff mechanism such as the electrical outlet relay 80, the gas range relay 68 and/or the electric range relay 70 is activated to stop the flow of electricity and/or gas. In this case, activation of these relays 68, 70 and 80, shuts off the gas and/or electric power to the appliances 18, 22 through the further activation of the gas solenoid 72 and electrical contactors 74, 82 respectively. At the same time, the speed of the fan 12 may be increased to increase the volume of air passing through the system 10, thus ridding the air of the contaminants. After a period of time, the signal may be reassessed by the microcontroller 14 or microprocessor 50 to ensure contaminants within the air have been removed to a safe level for cooking operations. In addition, the speed of the fan 12 may be maximized to hasten the removal of contaminants from the air. In a preferred embodiment, the time interval between air samplings may last from about one second to about one minute, more preferably, the time interval may range from about 1 second to about 30 seconds.

In a preferred embodiment, a signal may be received from the smoke sensor 56, the natural gas sensor 58, the carbon monoxide sensor 60, the radon gas sensor 62, and the photocatalytic sensor 63 by the microcontroller 14 or microprocessor 50. If the signal is determined to correspond to a criteria that is above a respective threshold level, i.e., a natural gas threshold volume level, a radon gas threshold volume level, a carbon monoxide threshold volume level, a photocatalytic threshold volume level and/or a smoke threshold particle count, the microcontroller 14 or microprocessor 50 triggers the shutoff mechanism such as the electric range relay 70, the gas range relay 68 and the electrical outlet relay 80 such that the electricity or gas to at least one of these appliances 18, 22 is turned off and thus become inoperable.

Specifically, in a preferred embodiment, the electrical and gas relays 70, 68 activate the electrical contactors 74, 82 and the gas solenoid 72 respectively, which turns off the gas and electricity to the respective stove 18 and surrounding electrical outlets 20. At the same time, the ventilation fan relay 66 may be activated to turn on and increase the speed of the fan 12, thereby increasing air movement through the air filtration subassembly 24 and/or the ventilation side opening 36 thus ridding the air of contaminants. When the microprocessor 14 or microprocessor 50 determines from the signal or signals emanating from sensors, 56, 58, 60, 62, or 63 that the measured parameter is above an established threshold level(s), the gas and/or electricity powering at least one of the oven 12 and appliance 22 is shutoff by actuation of at least one shutoff mechanism. In addition, the speed of the fan 12 may be maximized for a period of time ranging from about 1 second to 60 seconds. After which time, the gas and/or electrical power to the stove 18 and surrounding electrical outlets 20 is restored by a second actuation of the shutoff mechanism. In a preferred embodiment, the parameter may be one or more of the following criteria, an ultrafine particle content, an ultrafine particle count, an ultrafine particle concentration, a radon gas concentration, a radon gas volume, a natural gas volume, a natural gas concentration, a carbon monoxide volume, a carbon monoxide concentration, a temperature, a smoke particle count, a smoke concentration, an electrical current, or electrical voltage.

In an additional embodiment, the signal from these additional sensors 56, 58, 60, 62 and 63 may be analyzed again to determine if the level of contaminants within the air has reached a level below the respective threshold levels. Once it is determined that the measured criteria is below the established threshold level(s), the gas and/or electrical power to the stove 18 and surrounding electrical outlets 20 is restored. It is contemplated that activation of shutoff mechanisms, such as relay switches 68, 70, 80 solenoid 72 or electrical contacts 74, 82 may occur when a respective sensor signal is determined to be above, below, or about equal to a threshold value.

Figure 1:
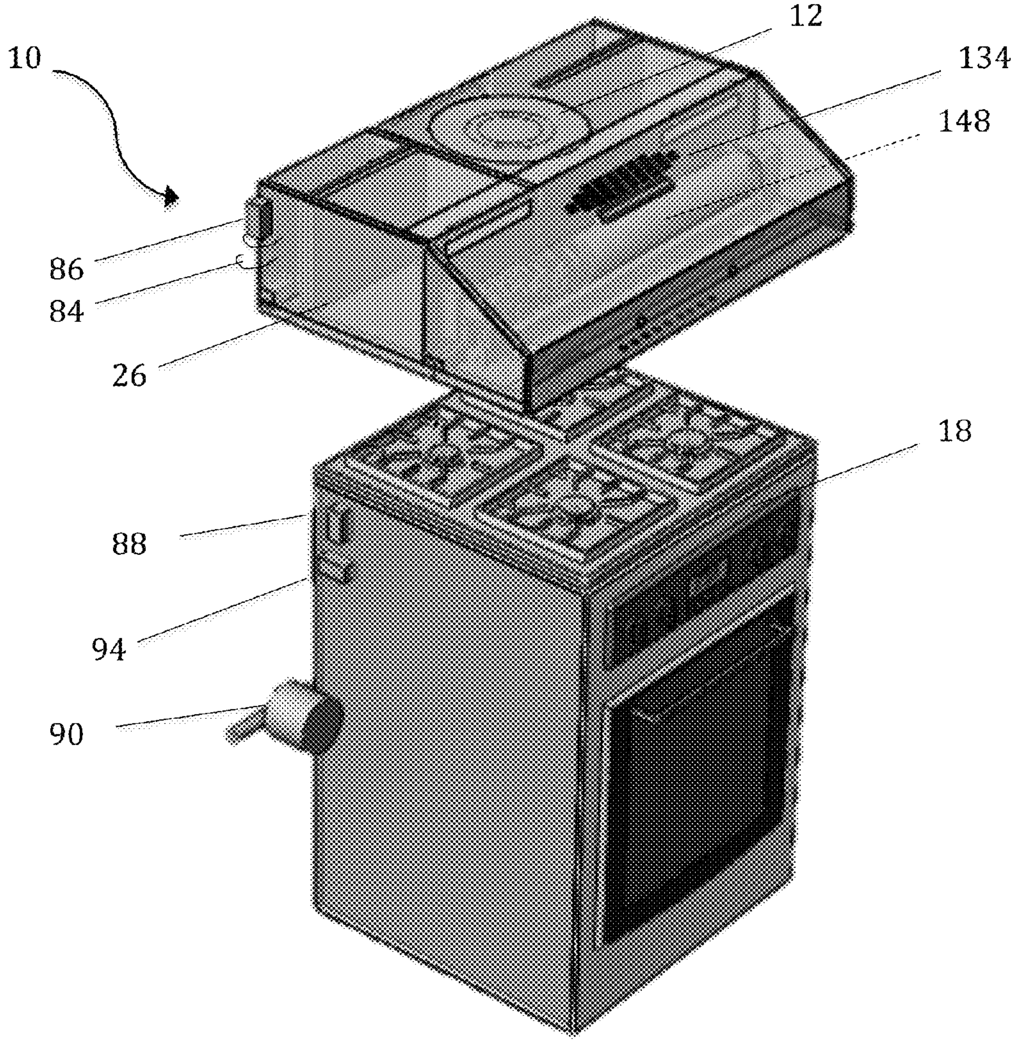
FIG. 1 illustrates a perspective view of an embodiment of the ventilation system of the present invention positioned within a range ventilation hood over a cooking area.

In a preferred embodiment, the microcontroller 14 or microprocessor 50 may communicate with at least one sensor 16 through a direct wire or wireless connection. For example, the microcontroller 14 or microprocessor 50 may be capable of transmitting a wireless signal 84 that activates the relay switches 66, 70 (FIGS. 1 and 10). Activation of the relay switches 66, 70 thus activates the oven 18 and electrical outlet 20 shutoff mechanisms. Specifically, when the microcontroller 14 or microprocessor 50 determines that the gas or electricity to the stove 18 or the electricity to the electrical power outlets 20 are to be turned off, the wireless signal 84 may be transmitted by a wireless transmitter 86. The wireless transmitter 86 may be positioned within the ventilation hood 26, particularly the plenum portion 28 of the hood 26, or alternatively, the transmitter 86 may be attached to a side panel of the ventilation hood 26, or positioned at a remote location within the food preparation area. A wireless receiver 88 located at a position distal of the wireless transmitter 86, receives the wireless signal 84 and activates or deactivates the shut off mechanisms, such as the gas solenoid 72 and/or the electrical contactors 74, 82. The wireless signal 84 may comprise a radio frequency (RF) signal or a magnetic induction signal.

In a further embodiment of the present invention, a signal to actuate and/or deactivate a respective shutoff mechanism 90 may be provided by a device that utilizes the X10 communication protocol. The X10 communication protocol utilizes the power line and internal electrical wiring within a dwelling to transmit an X10 signal. In a preferred embodiment, a transmitting X10 device is utilized to transmit the X10 signal through the wiring of the dwelling that activates the shutoff mechanism 90, particularly the electrical outlet relay 80. A corresponding X10 receiving device may be used to receive the X10 signal. In addition, the X10 communication protocol may utilize the wireless transmitter 86 and the wireless receiver 88 in transmitting the X10 signal and/or the wireless signal 84.

In a preferred embodiment of the present invention, a signal to actuate, control, and/or deactivate the respective shutoff mechanisms 90 may be provided by instructions or a protocol transmitted via the Internet. In a preferred embodiment, a computing device such as a desktop computer, a laptop computer, a tablet, a smart phone, a wearable computing device, or the like may be utilized to transmit instructions, a signal, or computer code via the Internet to activate, deactivate or control the operation of the ventilation system 10. Specifically, the instructions, signal or computer code transmitted via the Internet may activate, deactivate or control the operation of at least one of the shutoff mechanisms 90, relay switches 66, 70, electrical outlet shutoff mechanisms 20, ventilation fan 12, stove or oven 18, or sensors 16.

In a preferred embodiment, the instructions or signal transmitted via the Internet may control the operation of the microcontroller 14 or microprocessor 50, thereby controlling the operation of the system 10, such as the speed of the ventilation fan 12. The system 10 may be programmed to perform certain actions instantaneously or at a different time in the future. Such actions may include, but are not limited to, control of the speed of the ventilation fan 12, activating or deactivating the shutoff mechanism 20, or changing the sensor signal threshold value via the Internet. In addition, the state of the system 10, including the sensor signal values maybe actively monitored via the Internet. The "Internet" as defined herein means the single worldwide computer network that interconnects other computer networks, on which end-user services, such as World Wide Web sites or data archives, are located, enabling data and other information to be exchanged. The term "computing device" is defined herein as a device, usually electronic, that processes data according to a set of instructions. A computing device stores data in discrete units and performs arithmetical and logical operations at very high speed.

Alternatively, the ventilation system 10 may be activated when the intended use of the stove 18 or other food preparation appliances 22 is detected. In this embodiment, the microcontroller 14 or microprocessor 50 detects the intended use of the stove 18 and/or appliances 22 through the detection of the flow of gas and/or electrical current to the stove 18 and/or kitchen appliances 22 within the kitchen preparation area. More specifically, the system 10 may detect the initial flow of gas or electricity to the stove 18 as well as the surrounding electrical outlets 20 by monitoring the signals from the gas flow sensor 78, the first current sensor 76, or the second current sensor 83. Once the flow of gas and/or electricity is detected by the microcontroller 14 or the microprocessor 50, the signal from the various sensors 54, 56, 58, 60, 62 and 63 is analyzed. If it is determined from analysis of the respective sensor signal that the measured parameter is above a threshold level, the flow of gas and/or electricity to the stove 18 and/or appliances 22 is shutoff for a predetermined period of time and the fan speed is increased to rid the air of contaminants.

In yet another alternate embodiment, the system 10 may automatically shut off the gas and/or electricity when the flow of gas and/or electricity, powering the stove 18 and appliances 22 is detected. In this embodiment, once the microcontroller 14 detects the initial flow of gas and/or electricity through the gas flow sensor 78, the first current sensor 76, and/or the second current sensor 83, the microcontroller 14 or microcontroller 50 activates the respective shutoff mechanism, such as the gas solenoid 72 and electrical contactors 74, 82 to thereby turn off the electricity and/or gas for a period of time. At the same time, the ventilation fan relay 66 may be activated to increase the speed of the fan 12, particularly to a maximum level, to rid the air of contaminants. Once the period of time has passed, i.e., from about 1 second to about 60 seconds, the gas solenoid 72 and electrical contactors 74, 82, powering the stove 18 and appliances 22, are turned back on.

As shown in FIG. 1, a shutoff mechanism such as a stove shut off mechanism 90 is provided by the system 10. In a preferred embodiment, the stove shutoff mechanism 90 comprises a mechanical mechanism. Although a mechanical stove shutoff mechanism is preferred, a pneumatic or an electrical stove shut off mechanism may also be used with the system 10. Furthermore, the stove shutoff mechanism 90 may be designed to shut off an electric and/or gas powered stove 18. Examples of such over shutoff mechanisms are disclosed in U.S. Pat. Nos. 4,813,487 and 4,979,572, both to Mikulec et al., the disclosures of which are incorporated herein by reference. In an embodiment, the microcontroller 14 or microprocessor 50 may activate a microswitch 92 (FIG. 3) that transmits a wireless signal 84 that activates these mechanical or electrical stove shutoff mechanisms.

As shown in FIGS. 1 and 10, the sensors 54, 56, 58, 60, 62, and 63 may be electrically connected to an alarm 94. The alarm 94 may be of an audible or visual alarm such that it emits an audible or visual alert signal. The alarm 94 may be electrically connected to the micro-switch 92, the microprocessor 50 or the electric outlet relay switch 80 such that in the event that the ventilation system 10 detects the presence of smoke, natural gas, carbon monoxide, radon gas or the like, the alarm 94 is activated emitting an audible alarm sound, an electrical signal, or a visible alarm indictor is shown. Such an alarm signal may be connected to a burglar alarm system (not shown). Furthermore, the alarm 94 may transmit a signal or an alert via the Internet. Such a signal may be received by a computer, smart phone, tablet or wearable computing device to notify a user or emergency personnel that the ventilation system 10 has been activated or that a certain concentration of air-borne particles, i.e., smoke, or a gas such as natural gas, carbon monoxide, radon gas or the like has been detected.

In addition, the ventilation system 10 may be designed such that when the alarm 94 is activated, a signal is sent to a remote location such as a central control room, a fire station, a police station, or other first response station. This signal may be sent through a dedicated hard wire line, a telephone landline, a wireless mobile phone or the Internet. It is further contemplated that such a signal may be transmitted through an X10 communication protocol, as previously described, or via the wireless transmitter 86.

As illustrated in FIGS. 1 and 10, the system 10 may also comprise a motion sensor 96 such that when the stove or over 18 is on for a prescribed amount of time, such as from about 1 minute to about 30 minutes, and no motion has been detected, the alarm 94 of the system 10 may be activated. In addition, a video camera 98 and/or microphone 100 may also be connected to the system 10. The image and audio inputs from the video camera 98 and/or the microphone 100 may also be used to detect motion next to the stove 18 and thus be incorporated into the operation of the alarm 94. In addition, the image and/or audio input signals from the respective video camera 98 or microphone 100 may also be accessed via the Internet.

As previously mentioned, the ventilation system 10 of the present invention may comprise an air purification subassembly 24. In a preferred embodiment, the subassembly 24 comprises at least a filtration screen 102 and a carbon filter 104. The carbon filter 104 is enclosed within a filtration housing 106. The filtration screen 102 is preferably positioned adjacent to the air intake opening 30 of the fan 12. In a preferred embodiment, the filtration screen 102 is positioned such that the contaminated air 34 flows through the filtration screen 102 into the fan housing 48 and is thus circulated by the impellor 46 of the fan 12. The impellor 46 propels the air through the filtration sub-assembly 24. In a preferred embodiment, the filtration screen 102 is composed of a metal such as stainless steel. Alternatively, the filtration screen 102 may be composed of graphene or coated with a layer of titanium oxide or graphene. Additional filters such as a hepa filter 108 and a glass mesh filter 110 may also be integrated within the purification subassembly 24 within the filtration housing 106.

Figure 5:
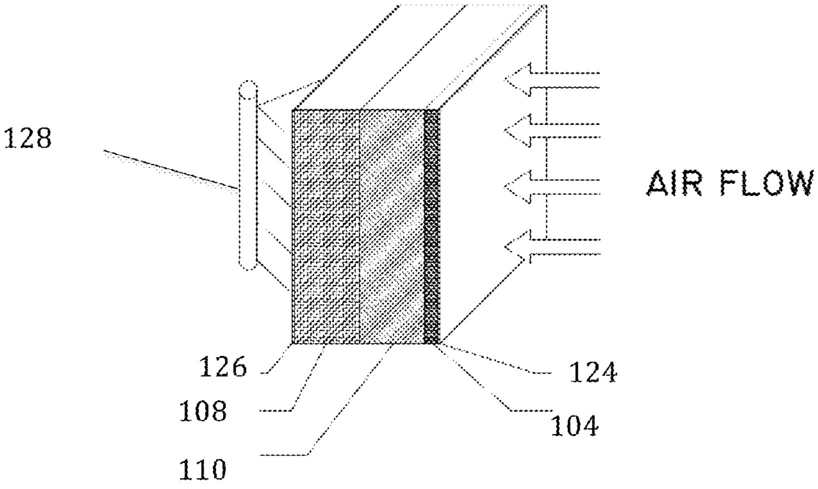
FIG. 5 shows a magnified perspective view illustrating an embodiment of the filters that comprise the filtration compartment.

FIGS. 2, 3, and 5 illustrate an embodiment of the purification subassembly 24 of the ventilation system 10 positioned within the ventilation hood 26. As shown in FIG. 2, two purification compartments 112A, 112B are positioned within the plenum portion 28 of the hood 26. In the illustrated embodiment, the impellor 46 is positioned therebetween such that contaminated air 34 may enter each of the compartments 112A, 112B. Although two filtration compartments 112 are illustrated, the ventilation system 10 may comprise at least one compartment 112 positioned within the hood 26. Furthermore, the filtration compartment or compartments 112 of the filtration subassembly 24 may be positioned in a multitude of locations within the plenum portion 28 of the ventilation hood 26. For example, the compartment 112 may be positioned to the right or left of the fan 12 as well as in the front or back of the ventilation hood 26. Furthermore, the filtration compartment 112 may be positioned circumferentially around the impellor 46 of the fan 12. In either case, the ventilation sub assembly 24 is designed such that the fan 12 forces contaminated air 34 therewithin. Although the filtration compartment 112 is shown with a rectangular cross-section, the compartment 112 may be designed having a cross-sectional shape of a multitude of polygons including but not limited to, a triangular, a curve, a circle, a hexagon, a square, or the like.

FIGS. 6, 9A, and 9B illustrate embodiments of the airflow pattern through the fan 12 and the system 10. As illustrated, the impellor 46 rotates within the fan housing 48. In a preferred embodiment, contaminated air 34 enters the air intake opening 30 and exits either through an air exit opening 114 within a sidewall of the fan housing 48 (FIG. 9A) or is circulated through the filtration subassembly 24 (FIG. 9B). More specifically, in an embodiment as shown in FIG. 9A, contaminated air 34 enters through the air intake opening 30 and directly exits the side opening 36 of the ventilation hood 26, thus exiting the system 10 and the dwelling. As shown, the side opening 36 is positioned through a back sidewall of the ventilation hood 26, however, the side opening may be positioned through a top sidewall 138, a left sidewall 140 or a right sidewall 142 of the ventilation hood 26, thus exiting the system 10 and the dwelling.

In an alternate embodiment, as shown in FIG. 9B, contaminated air 34 enters through the air intake opening 30, passes through the filtration subassembly side openings 132 and circulates through the air filtration compartment or compartments 112. In this alternate embodiment, contaminated air 34 is not exited out the side opening 36 of the ventilation hood 28 but rather is circulated through the filtration subassembly 24 and exists out as purified air 35 through a ventilation hood exit opening 134 as shown in FIGS. 8 and 9B.

Airflow through the ventilation system 10, whether directed through the filtration subassembly 24 or immediately exited out the ventilation hood side opening 36, is preferably determined by the microcontroller 14 or microprocessor 50. In a preferred embodiment, the system 10 may comprise a filtration subassembly side opening latch 133 as well as a ventilation hood side opening latch 37. The filtration subassembly side opening latch 133 is generally positioned adjacent the filtration subassembly side openings 132. The ventilation hood side opening latch 37 is generally positioned adjacent the ventilation hood side opening 36 or alternatively on a portion of a ventilation side door 144. These latches 37, 133, may comprise a magnetic, an electro-magnet or a spring hinge mechanism that controls airflow through the filtration side opening 132 and ventilation hood opening 36 respectively. For example, the filtration subassembly side opening latch 133 may control the opening and closing of a filtration subassembly side door that slides back and forth in front of, or, in back of the openings 132. Alternatively, the subassembly filtration side opening latch 133 may control the opening and closing of individual door portions that cover the openings 132. In either case, the microcontroller 14 or microprocessor 50 preferably controls the opening and closing of the filtration subassembly openings 132. Furthermore, the microcontroller 14 or microprocessor 50 may also control the opening and closing of the ventilation side opening 36 through the activation or deactivation of the ventilation hood side opening latch 37.

In a preferred embodiment, when contamination is detected by the sensors 54, 56, 58, 60 or 62, that is determined to be above a respective threshold level, the microcontroller 14 or microprocessor 50 activates the filtration subassembly side opening latch 133 such that the filtration subassembly side openings 132 are closed, thereby preventing airflow through the filtration subassembly 24. Alternatively, the microcontroller 14 or microprocessor 50 may activate the ventilation hood side opening latch 133 such that the ventilation hood side opening 36 is open to allow for contaminated air 34 to pass therethrough. Furthermore, when contamination is detected, the speed of the fan impellor 46 is increased to rid the contaminated air from the system 10. Once the level of contaminants is determined to be below a respective threshold level, the microcontroller 14 or microprocessor 50 deactivates the filtration subassembly side opening latch 133 such that air passes through the filtration subassembly openings 132 and through the air filters. In addition, the microcontroller 14 or microprocessor 50 may activate the ventilation hood latch mechanism 37 such that the ventilation side opening door 144 is closed thereby preventing airflow through the ventilation side opening 36. In a preferred embodiment, airflow through the system 10 is either exited out the ventilation side opening 36 or is circulated through the filtration subassembly 24.

In addition to controlling the activation and deactivation of the latch mechanisms 133, 37, the microcontroller 14 or microprocessor 50 may also adjust the speed of the fan 12 to control the opening and closing of the filtration side openings 132 and/or the ventilation hood opening 36. Air pressure generated from the increased speed of the fan 12, may open or close the ventilation hood side opening 36. Specifically, an air velocity within the ventilation hood 26 may be achieved such that the door portion 144 covering the opening 36 is opened thereby allowing at least a portion of the contaminated air to exit. Furthermore, the filtration subassembly openings 132 may be designed such that the increased velocity of the air within the system 10 causes the openings 132 to close. Once the velocity of the air within the ventilation hood 26 is reduced, the door portion 144 covers the opening 36 thereby preventing air from escaping the opening 36. Thus, when air contamination is detected, the increased speed of the fan 12 may force at least a portion of the contaminated air 34 out the ventilation hood opening 36 thereby bypassing the filtration subassembly 24. Likewise, when the air is determined to have a contamination level below a respective threshold level, the fan speed is reduced, thereby closing the door portion 144 of the ventilation hood opening 36 and opening the filtration subassembly openings 132. Therefore, the system 10 of the present invention provides an automatic dynamic filtration system such that air of increased contamination levels is exhausted from the food preparation area quickly and efficiently and air having a reduced level of contamination is circulated through the filtration subassembly 24 and is returned to the food preparation area is purified air 35.

Figure 4:
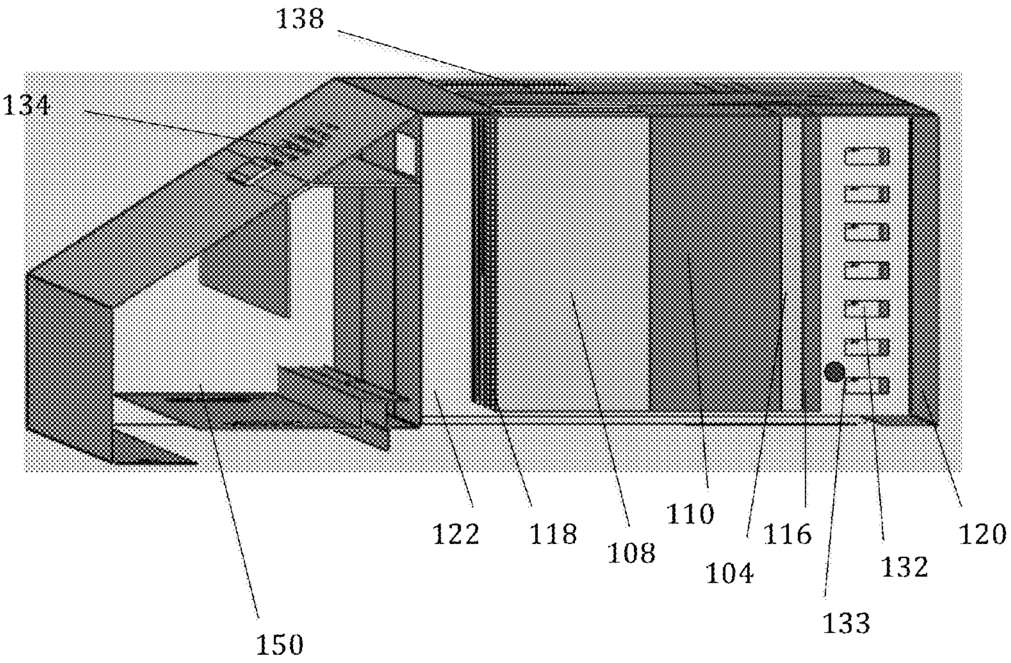
FIG. 4 is a cross-sectional view taken along a longitudinal axis of FIG. 3 illustrating an embodiment of the components comprising the air purification subassembly.

FIG. 4 illustrates a cross-sectional view of an embodiment of the filtration compartment. As shown, the compartment 112 comprises a distal end portion 116 spaced from a proximal end portion 118, the distal end 116 positioned adjacent a back side 120 of the ventilation hood 26 and the proximal end portion 118 of the compartment 112 positioned adjacent a front side 122 of the ventilation hood 26.

FIG. 5 illustrates an isolated perspective view of the filtration subassembly 24. In the example shown, a first filtration mesh 124 is positioned about the distal end 116 of the compartment 112. The carbon filter 104 is preferably positioned adjacent and proximal of the first filtration mesh 124. As shown, the glass mesh filter 110 may be positioned adjacent and proximal of the carbon filter 104. The hepa filter 108 is positioned adjacent and proximal of the glass mesh filter 110 and a second filtration mesh 126 may be positioned adjacent and proximal of the hepa filter 108. It is noted that the carbon filter 104, the hepa filter 108, the glass filter 110 and the first and second screen meshes 124, 126 may be positioned in a multitude of non-limiting sequential orders. For example, the hepa filter 108 may be positioned within the filtration compartment 112, distal of the carbon filter 104 and additional screen meshes may also be used. Furthermore, the filters 104, 108, 110 and screen meshes 124, 126 may be designed in a modular construction such that each individual filter 104, 108, 110 and/or screen mesh 124, 126 may be removed separately and re-installed in the filtration compartment 112.

In a preferred embodiment, the carbon filter 104 may comprise activated carbon, granulated carbon or combinations thereof. In addition, the carbon filter 104 may comprise graphene, either in pellet or power form residing therewithin. Furthermore, a portion of the carbon filter 104 may comprise a mixture of carbon and a polymeric material such as polypropylene or polyethylene. In a preferred embodiment, the portion of the polymeric material may be interwoven within the carbon material such as in a pad or fabric form.

In a preferred embodiment, the carbon filter 104 and the first screen mesh 124 are designed to promote the formation of an electro static charge therewithin that removes particulate contaminants from the air. Preferably, the first screen mesh 124, and interwoven carbon and polymeric material within the carbon filter 104 work in concert to generate the static electric charge that removes the particulates from the air. Alternatively, the filtration subassembly 24 may be electrically connected to the power source 52 thereby creating an electrostatic charge therewithin that forces the air to pass through the series of filters and screens.

The carbon filter 104 may have a thickness ranging from about 0.5 inches to about 5 inches. Likewise, the hepa filter 108 may have a thickness ranging from about 0.5 inches to about 5 inches. In an embodiment, the filtration subassembly 24 may comprise more than one of each of the filters 104, 108, 110. Furthermore, the filtration subassembly 24 may be designed with any number or combinations of the filters and filter mesh screens 104, 108, 110, 124 and 126. For example, the filtration subassembly 24 may comprise the carbon filter 104 and glass filter 110. In another embodiment, the subassembly 24 may comprise the carbon filter 104 and the hepa filter 108. Furthermore, an antimicrobial coating may be applied to the surfaces of the filters 104, 108, 110 and/or an interior surface of the filtration housing 106.

As shown in FIGS. 3 and 5, an ultra violet (UV) light source 128 is positioned at the proximal end 118 of the filtration compartment 112. The ultra violet light source 128 works in conjunction with the second filtration mesh 126 to provide a photocatalytic process whereby microorganisms and viruses that may be present within the air are destroyed. In a preferred embodiment the first and second filtration meshes 124, 126 are composed of a metal such as stainless steel. An exterior coating of titanium oxide, graphene or combinations thereof may be applied to the first screen mesh 124 or second screen mesh 126. Furthermore a layer of titanium oxide, graphene and combinations thereof may be applied to the exterior surfaces of the hepa filter 108, the carbon filter 104 and/or the glass filter 110.

The titanium oxide coating, in combination with the ultra violet light, initiates the photocatalytic process. In addition, the interior and/or exterior surfaces of the filtration housing 106 may also be coated with titanium oxide or graphene to promote the photocatalytic process. Likewise, at least a portion of an interior surface of the ventilation hood 26 may also be coated with titanium oxide and/or graphene. Furthermore, the fan speed may be modified to adjust the volume and velocity of the air moving through the series of filters 104, 108, 110.

In a preferred embodiment, the air speed may be reduced in a cyclical manner such that the exposure time of the air to the UV light source 128 and the second screen mesh 126 is increased. For example, the speed of the air may be reduced to below 5 CFM for a period of time ranging from a 1 sec to about 5 seconds, at which time, the CFM of the air through the filtration compartment 112 is increased. The UV light source 128 may be controlled by the microcontroller 14 such that it turns on and off at prescribed times or programmable sequences.

In addition, the photocatalytic sensor 63 (FIG. 3) may monitor the photocatalytic process and provide information regarding the photocatalytic process to the microcontroller 14. This information may cause the microcontroller 14 to modify the intensity of the UV light source 128 and/or activate the shutoff mechanisms 90 comprising the electric range relay 70, gas range relay 68, electrical outlet relay 80, ventilation fan relay 66, electric range contactor 74, electrical outlet contactor 82, or gas solenoid 72.

The filtration compartment 112 is constructed in a sealed tight manner such that air does not leak out of the compartment 112. A seal 130 may be positioned around the compartment 112 and housing 106 to prevent the undesirable leakage of air either moving in or out of the compartment 112. In a preferred embodiment, a backpressure of air is created within the compartment 112. It is this backpressure of air that allows the air to circulate through the system 10. As shown in FIG. 7, the contaminated air 34 enters the air intake opening 30 of the fan 12. Air is circulated by the fan 12 and enters the distal end 116 of the filtration compartment 112. As shown, the contaminated air 34 proceeds through a series of air filtration subassembly side openings 132 within the filtration housing 106. The air then travels from the distal end 116 of the filtration compartment 112 through the series of filters 104, 108, 110 and screen meshes 124, 126 to the proximal end 118 of the compartment 112. The filtered air 35 then exists the ventilation system 10 through the ventilation hood exit opening 134 shown in FIGS. 1 and 8.

In an embodiment, the ventilation system 10 of the present invention may comprise a series of status lights 146, which indicate the operational condition of the system 10. A light may be displayed in the event that a system failure has occurred such as a malfunctioning relay or sensor malfunction. In addition, a light may be displayed in the event that a contaminant is detected. For example, if ultra fine particles are detected a yellow light may be displayed, if natural gas is detected, a red light may be displayed, etc. Furthermore, the status light or lights 146 may operate in response to the operation mode of the system 10. For example, the status light or lights 146 may turn on or off, or change color and/or intensity based on the speed of the fan 12 or if there is a malfunction with the system 10.

In an embodiment, as shown in FIG. 1, the ventilation system 10 of the present invention may also comprise a fire suppression system 148. The fire suppression system 148 is also designed to reside within the ventilation hood 26. Specifically, the fire suppression system 148 may reside within the plenum portion 28 or a canopy portion 150 of the ventilation hood 26. Embodiments of various fire suppression systems and related apparatus are described in U.S. Pat. Nos. 4,756,839, 4,813,487, 4,979,572, 5,992,531, and 7,303,024, all to Mikulec and are incorporated by reference herein.

The fire suppression system 148 may operate independently or may be connected to the microcontroller 14 or microprocessor 50. The fire suppression system 148 comprises an actuator mechanism, which operates mechanically, electrically or pneumatically. In a preferred embodiment, the fire suppression system 148 further comprises a container within which is positioned a fire extinguishing material and a rod ejection mechanism. When the fire suppression system 148 is activated, the fire extinguishing material is expelled therefrom.

In addition, the ventilation system 10 may comprise a temperature sensor 152 that is electrically connected to the microcontroller 14 or microprocessor 50. In the event that a temperature is detected, for example, in the event that a predetermined temperature, for example, 200° F. is detected, the microcontroller 14 or microprocessor 50 may activate the gas and electrical shutoff mechanisms 90. In addition, the microcontroller 14 may increase the speed of the fan 12. Furthermore, the microcontroller 14 may send an alert signal to the first responder station. Moreover, when the set temperature is exceeded, the microcontroller 14 may activate the fire suppression system 148. In a preferred embodiment, in the event that a pre-determined temperature of the surrounding area is detected or that the fire suppression system 148 has been activated, a signal or instructions may be set by the microcontroller 14 or microprocessor 50 via the Internet to alert the user or emergency personnel.

In a preferred embodiment, the temperature sensor 152 may work in conjunction with input from the video camera 98 and/or the microphone 100. More specifically, information from the various input signals from the temperature sensor 152, the video camera 98 and/or the microphone 100 can be analyzed by the microcontroller 14 or microprocessor 50 to determine if there is a possible imminent danger of a fire thereby requiring activation of the fire suppression system 148 and/or the alarm 94. For example, if motion or sound has not been detected for approximately 5 to 60 minutes, and the temperature above the stove 18 is increasing to a cautionary temperature range of between about 100° F. to about 150° F., then the alarm 94 may be activated. If the temperature continues to rise into a critical temperature range above 150° F., then the fire suppression 148 may be activated to preemptively prevent a fire from occurring.

The attached drawings represent, by way of example, different embodiments of the subject of the invention. Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A ventilation system, comprising:

a) at least one microcontroller electrically connectable to an electrical power source;

b) at least one sensor capable of communicating with the at least one microcontroller, wherein the at least one sensor is further capable of emitting a sensor signal having at least one of a first and second sensor signal value;

c) an air filtration subassembly comprising at least one air filter;

d) at least one impellor electrically connectable to the electrical power source positioned adjacent the air filtration subassembly, the at least one impellor capable of variable speed operation and actuationable by the at least one microcontroller, wherein actuation of the impellor causes at least a portion of air to flow through the filtration subassembly;

e) a first actuation mechanism connectable to at least one of a stove and an electrical outlet;

f) wherein actuation of the first mechanism by the at least one microcontroller causes at least one of the stove and the electrical outlet to deactivate when the first sensor signal value is determined by the at least one microcontroller to be about equal to a first sensor signal threshold value; and g) wherein actuation of the first mechanism causes the at least one of the stove and electrical outlet to activate when the second sensor signal value is determined by the at least one microcontroller to be about equal to a second sensor signal threshold value that is different than the first sensor signal threshold value.

2. The system of claim 1 wherein the at least one sensor is selected from the group consisting of an ultra fine particle sensor, a temperature sensor, a smoke sensor, a carbon monoxide sensor, a natural gas sensor, a radon gas sensor, a gas flow sensor, an electrical current sensor, an electrical voltage sensor, and combinations thereof.

3. The system of claim 1 wherein the first or second sensor signal value ranges from about 0.01V to about 100V or from about 1 μA to about 100 mA.

4. The system of claim 1 wherein the first or second sensor signal threshold value ranges from about 1 μA to about 100 mA or from about 0.01V to about 100V.

5. The system of claim 1 wherein the sensor signal comprises an electrical voltage, an electrical current, or combination thereof.

6. The system of claim 1 wherein the speed of the impellor increases or decreases when the first or second sensor signal value is determined to be about equal to the first or second sensor signal threshold value.

7. The system of claim 1 wherein the at least one air filter is selected from the group consisting of a carbon filter, a hepa filter, a glass filter, and combinations thereof.

8. The system of claim 1 wherein the air filtration subassembly resides within a subassembly housing having respective interior and exterior housing surfaces, and wherein an antimicrobial coating resides on at least a portion of at least one of the exterior and interior subassembly housing surfaces.

9. The system of claim 1 further comprising an ultra violet light source positioned adjacent the air filtration subassembly.

10. The system of claim 1 wherein at least one of the microcontroller, the impellor, and the filtration subassembly resides within a ventilation system housing.

11. The system of claim 10 wherein the ventilation system housing comprises a stove hood.

12. The system of claim 10 wherein actuation of the at least one impellor causes at least a portion of air to flow through an opening that extends through a sidewall of the housing.

13. The system of claim 1 wherein the first actuation mechanism is selected from the group consisting of a natural gas shutoff mechanism, an electricity shutoff mechanism, a gas relay switch, an electric range relay switch, a gas solenoid, an electric range contactor, a mechanical mechanism, an electrical mechanism, a pneumatic mechanism, and combinations thereof.

14. The system of claim 1 further comprising a second actuation mechanism electrically connectable to the at least one of a stove and an electrical outlet, the second actuation mechanism activatable by the at least one microcontroller, wherein activation of the second actuation mechanism causes at least one of the stove and the electrical outlet to activate or deactivate.

15. The system of claim 14 wherein the second actuation mechanism is selected from the group consisting of a gas shutoff mechanism, an electricity shutoff mechanism, a gas relay switch, an electric range relay switch, a gas solenoid, an electric range contactor, a mechanical mechanism, an electrical mechanism, a pneumatic mechanism, and combinations thereof.

16. The system of claim 1 wherein actuation of the first actuation mechanism causes the impellor to activate or deactivate.

17. The system of claim 1 further comprising an alarm actuationable by the at least one microcontroller.

18. The system of claim 1 wherein at least one of the first actuation mechanism, microcontroller, impellor, and sensor is actuationable by an X10 communication protocol signal, a wireless signal, a computer code, or a signal transmitted via the Internet.

19. The system of claim 1 wherein at least one of the first actuation mechanism, microcontroller, impellor, and sensor is programmable by instructions, electrical signal, or computer code sent by a computing device via the Internet.

20. The system of claim 1 wherein the microcontroller is capable of transmitting an electrical signal, instructions, or computer code via the Internet.

21. The system of claim 1 wherein the at least one sensor is hard wired or wirelessly connected to the at least one microcontroller.

22. The system of claim 1 further comprising a camera capable of providing a video signal to the microcontroller, a microphone capable of providing an audio signal to the microcontroller, a motion sensor capable of providing a motion sensor signal to the microcontroller, a wireless transmitter capable of transmitting a wireless signal, a wireless receiver capable of receiving a wireless signal and combinations thereof.

23. The system of claim 1 further comprising a fire suppression system positioned over a cooking surface of the stove, wherein actuation of the fire suppression system causes expulsion of a fire retardant material therefrom.

24. The system of claim 23 wherein actuation of the fire suppression system occurs when the sensor signal is determined by the microcontroller to be about equal to a sensor signal threshold value.

25. The system of claim 1 wherein the electrical power source is selected from the group consisting of at least one electrochemical cell, an electrical outlet, and an electric generator.

26. A method of ventilation system operation, the method comprising the following steps:

a) providing a ventilation system, comprising:
   i) at least one microcontroller electrically connectable to an electrical power source;
   ii) at least one sensor capable of communicating with the at least one microcontroller, wherein the at least one sensor is further capable of emitting a sensor signal having at least one of a first and second sensor signal value;
   iii) an air filtration subassembly comprising at least one air filter;
   iv) at least one impellor electrically connectable to the electrical power source positioned adjacent the air filtration subassembly, the at least one impellor capable of variable speed operation and actuationable by the at least one microcontroller;
   v) a first actuation mechanism connectable to at least one of a stove and an electrical outlet and activatable by the at least one microcontroller; and
b) receiving the sensor signal from the at least one sensor by the microcontroller;
c) determining by the microcontroller a sensor signal value from the received sensor signal;
d) actuating the first mechanism thereby causing at least one of the stove and the electrical outlet to activate if the first sensor signal value is determined to be about equal to a first sensor signal threshold value; and
e) actuating the first mechanism thereby causing at least one of the stove and the electrical outlet to deactivate if the second sensor signal value is determined to be about equal to a second sensor signal threshold value not equal to the first sensor signal threshold value.

27. The method of claim 26 including selecting the least one sensor from the group consisting of an ultra fine particle sensor, a temperature sensor, a smoke sensor, a carbon monoxide sensor, a natural gas sensor, a radon gas sensor, a gas flow sensor, an electrical current sensor, an electrical voltage sensor, and combinations thereof.

28. The method of claim 26 wherein the first or second sensor signal value ranges from about 0.01V to about 100V or from about 1 μA to about 100 mA.

29. The method of claim 26 wherein the first or second sensor signal threshold value ranges from about 1 μA to about 100 mA or from about 0.01V to about 100V.

30. The method of claim 26 including selecting the at least one air filter from the group consisting of a carbon filter, a hepa filter, a glass filter, and combinations thereof.

31. The method of claim 26 including selecting the actuation mechanism from the group consisting of a gas shutoff mechanism, an electricity shutoff mechanism, a gas relay switch, an electric range relay switch, a gas solenoid, an electric range contactor, a mechanical mechanism, an electrical mechanism, a pneumatic mechanism, and combinations thereof.

32. The method of claim 26 including providing the microcontroller capable of transmitting and receiving an electrical signal, instructions, or computer code via the Internet.

33. The method of claim 26 including actuating the at least one impellor causing at least a portion of air to flow through the filtration subassembly.

34. The method of claim 26 including providing a housing, wherein the air filtration subassembly and the at least one impellor reside therewithin.

35. The method of claim 34 including actuating the at least one impellor causing at least a portion of air to flow through a sidewall opening of the housing.

36. The method of claim 26 wherein the first or second sensor signal value is dependent upon a measured ultrafine particle content, ultrafine particle count, ultrafine particle concentration, radon gas concentration, radon gas volume, natural gas volume, natural gas concentration, carbon monoxide volume, carbon monoxide concentration, temperature, smoke particle count, smoke concentration, amount of electrical current, amount of electrical voltage, or combinations thereof.

37. A ventilation system, comprising:

a) at least one microcontroller electrically connectable to an electrical power source;

b) at least one sensor capable of communicating with the at least one microcontroller, wherein the at least one sensor is further capable of emitting a sensor signal having at least one of a first and second sensor signal value;

c) an air filtration subassembly comprising at least one air filter;

d) at least one impellor electrically connectable to the electrical power source positioned adjacent the air filtration subassembly, the at least one impellor capable of variable speed operation and actuationable by the at least one microcontroller, wherein actuation of the impellor causes at least a portion of air to flow through the filtration subassembly;

e) a first actuation mechanism connectable to at least one of a stove and an electrical outlet; and f) wherein actuation of the first mechanism by the at least one microcontroller causes at least one of the stove and the electrical outlet to deactivate when the first sensor signal value determined by the at least one microcontroller to be about equal to a first threshold value; and g) wherein actuation of the first mechanism causes the at least one of the stove and electrical outlet to activate after a period of time from deactivation thereof.

38. The system of claim 37 wherein the at least one sensor is selected from the group consisting of an ultra fine particle sensor, a temperature sensor, a smoke sensor, a carbon monoxide sensor, a natural gas sensor, a radon gas sensor, a gas flow sensor, an electrical current sensor, an electrical voltage sensor, and combinations thereof.

39. The system of claim 37 wherein the first sensor signal value ranges from about 0.01V to about 100V or from about 1 μA to about 100 mA.

40. The system of claim 37 wherein the first sensor signal threshold value ranges from about 1 μA to about 100 mA or from about 0.01V to about 100V.

41. The system of claim 37 wherein the sensor signal comprises an electrical voltage, an electrical current, or combinations thereof.

42. The system of claim 37 wherein the speed of the impellor increases or decreases when the first sensor signal value is determined to be about equal to the first sensor signal threshold value.

43. The system of claim 37 wherein the at least one air filter is selected from the group consisting of a carbon filter, a hepa filter, a glass filter, and combinations thereof.

44. The system of claim 37 wherein the period of time ranges from about 1 second to about 60 seconds.

* * * * *